(12) United States Patent
Harwood

(10) Patent No.: US 10,741,217 B2
(45) Date of Patent: *Aug. 11, 2020

(54) INTELLIGENT MEDIA SYNCHRONIZATION

(71) Applicant: Ronald P. Harwood, West Bloomfield, MI (US)

(72) Inventor: Ronald P. Harwood, West Bloomfield, MI (US)

(*) Notice: Subject to any disclaimer, the term of this patent is extended or adjusted under 35 U.S.C. 154(b) by 66 days.

This patent is subject to a terminal disclaimer.

(21) Appl. No.: 15/803,905

(22) Filed: Nov. 6, 2017

(65) Prior Publication Data

US 2018/0061458 A1 Mar. 1, 2018

Related U.S. Application Data

(63) Continuation of application No. 14/857,846, filed on Sep. 18, 2015, now Pat. No. 9,812,171.

(60) Provisional application No. 62/189,702, filed on Jul. 7, 2015.

(51) Int. Cl.
| | |
|---|---|
| *G11B 27/10* | (2006.01) |
| *G11B 27/00* | (2006.01) |
| *G05D 25/02* | (2006.01) |
| *H04N 21/414* | (2011.01) |
| *H04N 21/43* | (2011.01) |
| *H04N 21/4363* | (2011.01) |
| *H04N 21/4402* | (2011.01) |

(52) U.S. Cl.
CPC ............ *G11B 27/10* (2013.01); *G05D 25/02* (2013.01); *G11B 27/005* (2013.01); *H04N 21/41415* (2013.01); *H04N 21/4307* (2013.01); *H04N 21/43637* (2013.01); *H04N 21/440281* (2013.01)

(58) Field of Classification Search
CPC ................................ G11B 27/10; G05D 25/02
See application file for complete search history.

(56) References Cited

U.S. PATENT DOCUMENTS

| | | | | |
|---|---|---|---|---|
| 9,812,171 | B2 * | 11/2017 | Harwood | ............... G11B 27/10 |
| 2010/0232771 | A1 * | 9/2010 | Prestenback | ........... H04N 5/765 |
| | | | | 386/201 |

\* cited by examiner

*Primary Examiner* — Girumsew Wendmagegn
(74) *Attorney, Agent, or Firm* — Great Lakes Intellectual Property, PLLC

(57) ABSTRACT

Intelligent synchronization of media or other material output from multiple media devices is contemplated. The intelligence synchronization may include instructing the media devices to coordinate playback in concert with a conductor whereby the conductor acts a focal point or reference for the non-conducting media devices. The non-conductor may transmit sync messaging having data or other information sufficient to facilitate coordinating operation of the non-conductors in a manner sufficient to synchronize output of the media.

20 Claims, 6 Drawing Sheets

| Sync Frame | Non-Condcutor Epoch | Conductor Epoch | Adjust |
|---|---|---|---|
| S | T | T | None |
| S1 | T1 | T1 | None |
| S2 | T1.5 | T2 | None |
| S3 | T2 | T3 | None |
| S4 | T2.5 | T4 | Forward |
| S5 | T5 | T5 | None |
| S6 | T6 | T6 | None |
| S7 | T7 | T7 | None |
| S8 | T8 | T7.5 | None |
| S9 | T9 | T8 | None |
| S10 | T10 | T8.5 | Pause |
| S11 | T9 | T9 | None |
| S12 | T10 | T10 | None |
| S13 | T11 | T11 | None |
| S14 | T12 | T12 | None |

Fig. 6

INTELLIGENT MEDIA SYNCHRONIZATION

CROSS-REFERENCE TO RELATED APPLICATIONS

This application is a continuation of U.S. provisional application Ser. No. 14/857,846, filed Sep. 18, 2015, which in turn claims the benefit of U.S. provisional application No. 62/189,702 filed Jul. 7, 2015, the disclosures of which are hereby incorporated in their entireties by reference herein.

TECHNICAL FIELD

The present invention relates to facilitating intelligent media synchronization, such as but not necessarily limited to intelligently synchronizing playback of sensory or other human-perceptible media from a plurality of output devices within auditory and/or visual range of each other.

BACKGROUND

The playback of media or other human-perceptible content from multiple output devices can be problematic when the output devices are within auditory and/or visual range to each other, or more particularly a person within range of two or more of the output devices, as the person may perceive auditory and/or visual differences depending on how the output devices play or otherwise deliver the media. Temporal offsets or other perceptible variances can arise when a media player or other element generating the media at one device plays or otherwise transmits the media after or before another, nearby device in a manner sufficient to cause the resulting signaling to arrive or be experienced at the person at perceptively different times. The amount of time or offset necessary to induce the perceived variations can vary depending on reflections, wavelength and any number of other factors, such as whether the media has an auditory and/or a visual component.

The person may perceive temporal variations for auditory components differently than visual components, i.e., a certain amount of temporal offset may be unperceived for auditory components and not for visual components or vice-a-versa. A precedent effect, for example, has shown when two identical sounds are presented in close succession, such as from different output devices, they will be heard or perceived at the person as a single fused sound, i.e., a sound without echo, in the event the corresponding signals arrive at the person with a lag or temporal offset around 5 ms for less complex sounds, like clicks, and around 40 ms for more complex sounds, like speech or piano music. An undesirable echo or other variation can be perceived at the person, such as when the two signals fail to provide a fused sound, in the event the lag or temporal offset exceeds the range associated with the corresponding sound or complexity of the sound. A similar phenomenon can occur with visual signals, such as strobes, lights, lasers, video, etc., optionally with different tolerances for the lag, i.e., visually components may have shorter or longer ranges of tolerance.

One non-limiting aspect of the present invention contemplates intelligently synchronizing media communicated from multiple output devices within auditory and/or visual range of a person so as to minimize and/or eliminate the perceived variations resulting from temporal deviations in transmission, playback and/or other influencing operations associated with the corresponding media.

BRIEF DESCRIPTION OF THE DRAWINGS

FIG. 6 illustrates a timing log in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
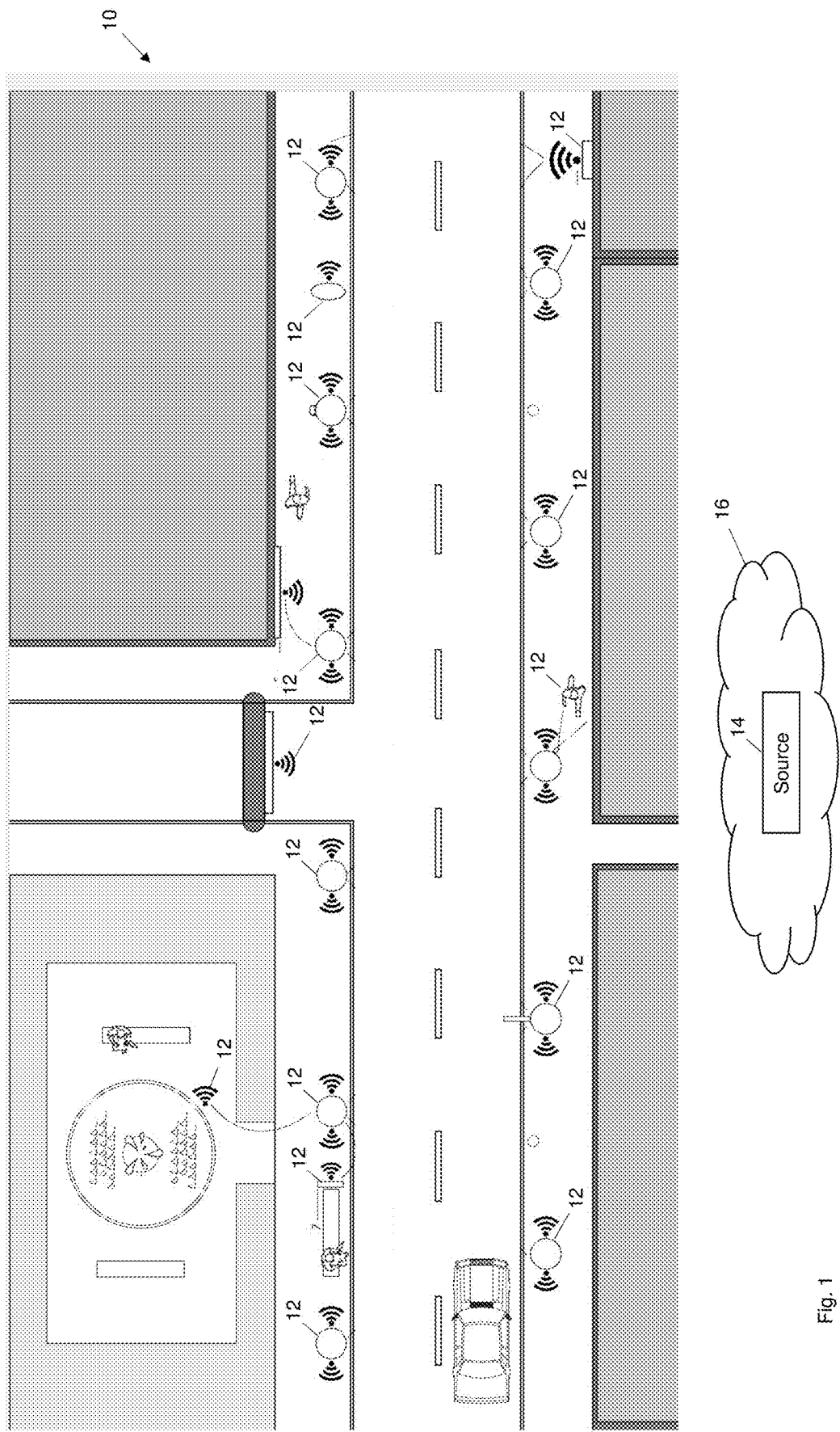
FIG. 1 illustrates a media system configured to facilitate intelligently synchronizing media playback in accordance with one non-limiting aspect of the present invention.

FIG. 1 illustrates a media system 10 configured to facilitate intelligently synchronizing media playback in accordance with one non-limiting aspect of the present invention. The system 10 may include a plurality of media devices 12 configured to facilitate communicating or otherwise outputting media or other content, signals, etc. to a surrounding area, such as in the manner described in U.S. Pat. No. 9,071,911, the disclosure of which is hereby incorporated by reference in its entirety herein. A source 14 may be remotely located to provide the media and/or suitable instructions to the media devices (such as but not limited to a smart gateway, virtual server or cloud) 12 over a network 16. The network 16 may be wireline and/or wireless network(s) sufficient for facilitating communications between the source 14 and the media devices 12, optionally in a mesh manner where the source 14 communicates with one or more of the media devices 12 operable as an edge or smart gateway such that that media device 12 then subsequently communicates with the remaining media devices 12, such as in the manner described in Institute of Electrical and Electronics Engineers (IEEE) Standard 820.15.4 for Local and metropolitan area networks—Part 15.4: Low-Rate Wireless Personal Area Networks (LR-WPANs), the disclosure of which is hereby incorporated by reference in its entirety herein.

Figure 2:
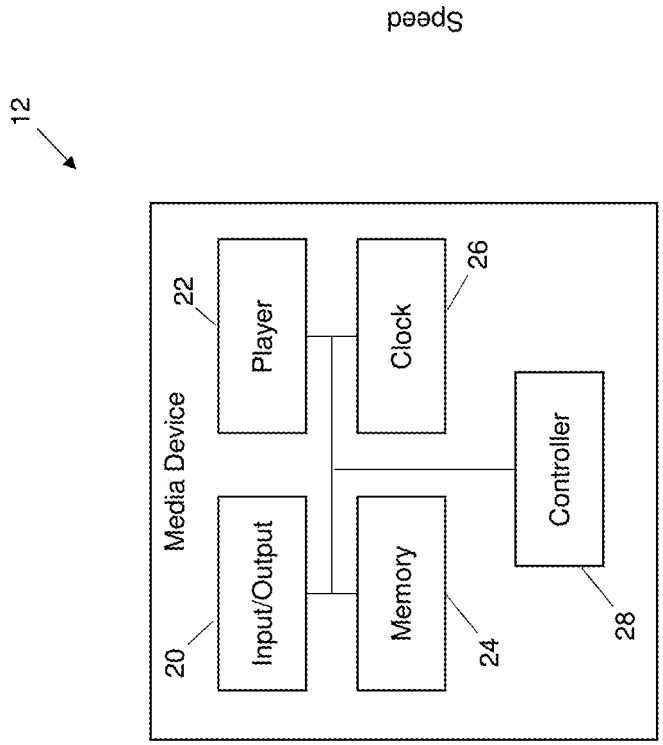
FIG. 2 illustrates a media device in accordance with one non-limiting aspect of the present invention.

FIG. 2 illustrates one of the media devices 12 in accordance with one non-limiting aspect of the present invention. The media devices 12 may be generally characterized as any unit capable of emitting audio, visual, and/or audio-visual (video) signals to the surrounding areas. The media devices 12 may include memories, processors, communication interfaces and other features to facilitate the operation thereof and are shown for exemplary purposes to include an input/output 20, a player 22, a memory 24, a clock 26 and a controller 28. The input/output 20 may facilitate exchange of control or other messages with the network and/or a user interface, display, etc. (not shown). The player 22 may cooperate the input/output to facilitate playing media stored on the memory 24 according to scheduling and other instructions of the controller 28 or a program associated therewith time with the clock 26. The media devices 12 are shown for exemplary purposes as being deployed along a street or trafficked throughway in order to facilitate communicating media to persons, vehicles and other objects in the vicinity thereof, however, the media devices 12 may be synchronized in the contemplated manner when deployed in virtually any sized area.

One or more of the media devices 12 may be a lighting fixture configured to emit light and/or other visual signals to the surrounding area. The lighting fixtures (or any light emitting device) may be controlled to perform any number of operations, including operations associated with theatrical lighting maneuvers, and/or controlled according to any number of standards and protocols, including those specified in the DMX-512 protocol defined by the United States Institute for Theatre Technology, Inc. (USITT). One or more of the media devices 12 may be an audio unit configured to emit audio signals to the surrounding area according to a playlist of other set of instructions. Alternatively, the audio units may be configured to tune to particular buffered or real-time audio streams for broadcasting to the surrounding area. The audio unit may be a banner type speaker unit, such as that specified in United States patent and patent applications, 2013/0142372; 2013/0083537; U.S. Pat. Nos. 8,442,242; 8,098,852; 8,477,967; 7,219,873; 7,607,512 and 6,769,509, the disclosures of which is hereby incorporated in their entireties by reference herein. One or more of the media devices 12 may be a video unit configured to emit video signals to the surrounding area. The video unit may include a television screen or other display and an audio source to facilitate emitting audio-video signals to the surrounding area. The video units may be configured to tune to particular buffered or real-time video streams for broadcasting to the surrounding area and/or to receive video signals from a service provider or other entity.

The source 14 may be generally characterized as any unit (software or hardware) capable of generating instructions for controlling operations of the media devices 12. The source 14 may include memories, processors, and other features for executing any number operations, including a communication feature to facilitate electronic communications with the media devices 12. The source 14 may be configured to receive and/or generate a control strategy for controlling operations of the media devices 12 and/or a communications strategy for controlling communications between the media devices 12. The source 14 may be a standalone feature having applications for use in controlling the media devices 12 and/or the source 14 itself may be an application, such as that run by a computer or other processing means, which may be include on one of the media devices 12, such as an edge device, for directly or indirectly controlling operation of the other media devices 12. The source 14 may be a software program, logic, or other feature embodied in a computer-readable medium or other suitable medium. The source 14, while shown as a feature separate from the media devices 12, may reside on one or more of the media devices 12 and need not be a separate feature.

The source 14 may be configured to receive or store a show schedule or other feature associated with formatting multiple operations of the media devices 12. The show schedule may include a timeline and corresponding operations to be executed at particular intervals or events. Queues, macros, and other features may be included within the show schedule to facilitate changing operations and other parameters associated with adjusting or otherwise varying operation of the media devices 12 to correspond with the show schedule. The control strategy may be based on the show schedule or other set of events for controlling operations of one or more of the media devices 12. Multiple control strategies may be generated and distributed to the media devices 12 to control the operation thereof. In particular, if the system 10 includes different types of the media devices 12, multiple control strategies may be provided for each type of media device 12. Optionally, a common control strategy may be distributed to multiple media devices 12 to control the media devices 12 to cooperatively execute a number of operations according to a predefined schedule, such as to execute an audio, lighting, or video show where operations of multiple media devices 12 are coordinated according to a common schedule.

The communications strategy may be used to control communications between the media devices 12 in accordance with IEEE 802.15.4 or other suitable communication strategy operable to facilitate the localized, group-based broadcasts and message contemplated to enable the intelligent synchronization of the present invention. The communications strategy may include features for coordinating delivery of the control strategy to other media devices 12. For example, the communications strategy may be used to facilitate delivery of one or more control strategies to one or more media devices 12 so as to permit the media devices to be deployed in the system 10 without having the control strategy loaded prior to the deployment thereof and/or to facilitate distribution of changes to the control strategy without requiring the source 14 to directly communicate with each media device 12. The communications strategy may include instructions for transporting particular control strategies to media devices 12 associated therewith, such as to permit multiple control strategies to be transported to the same or different media devices 12.

The communications strategy may be used to control communications of newly added media devices 12 with deployed media devices 12 and the source 14. The newly added media devices 12 may be configured to register or otherwise contact the deployed media devices 12 when attempting to enter the system 10. The deployed media devices 12 may consult the communication strategy and request information from the newly added media devices 12 to determine whether the newly added media devices 12 are to be added to the system 10. The other media devices 12 may authenticate or otherwise restrict access to the control strategy to media devices 12 meeting desired security parameters. The communications strategy may specify an authentication processes and other procedures for use in verify access to the control strategy. The approved media devices 12 may then be transferred the communications strategy to coordinate communications with other media devices in the system.

Once approved for addition to the system 10, the newly added media devices 12 may retrieve one or more control strategies from the source 14 and/or other media devices 12 according to instruction included within the communications strategy. In this manner, the present invention is able to dynamically build an environment wherein media devices 12 may be freely added and controlled without requiring registration and authentication with the source 14 or other system administrators. The source 14 may be configured to receive and/or generate a network integrity strategy. The network integrity strategy may be used to monitor the media devices 12 in the system 10 and to determine whether the monitored media devices 12 are operation according to the desired control strategy. The network integrity strategy may be configured to periodically poll the media devices 12 and to determine whether media devices 12 have been added or removed from the system 10.

Figure 3:
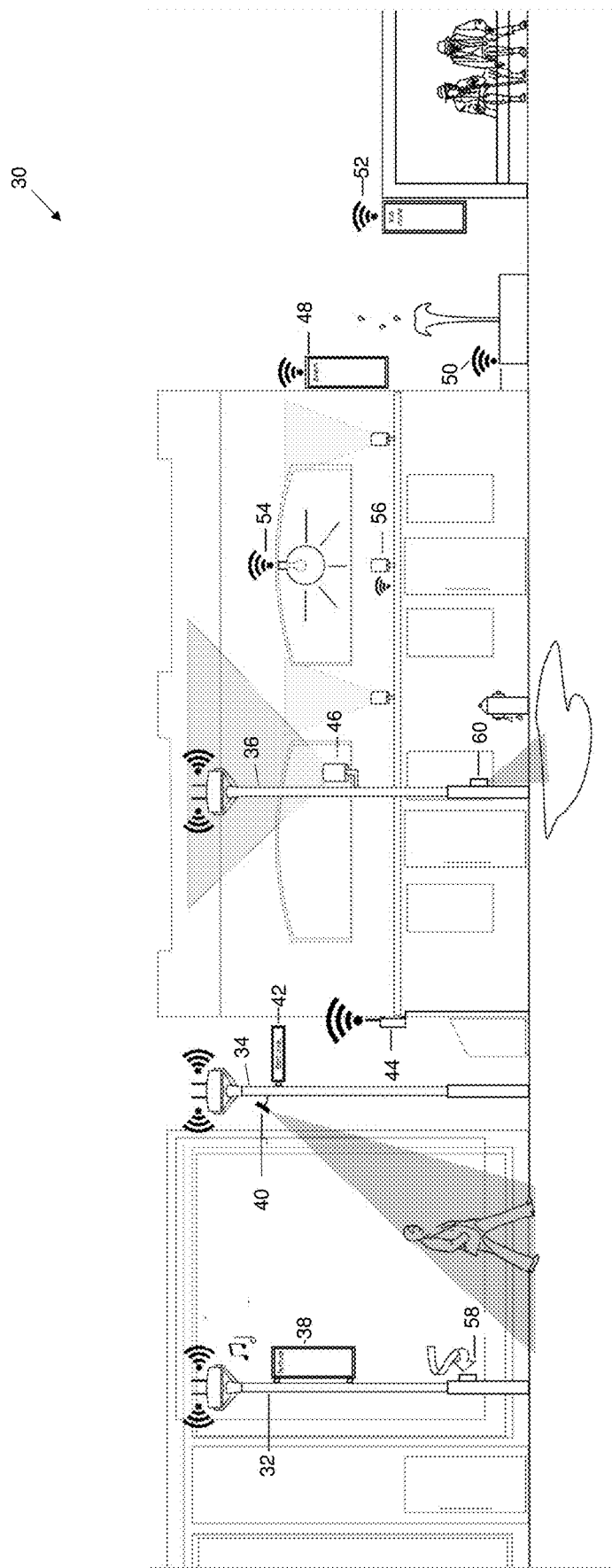
FIG. 3 illustrates a street-level view of a media system in accordance with one non-limiting aspect of the present invention.

FIG. 3 illustrates a street-level view 30 in accordance with one non-limiting aspect of the present invention. The street-level view 30 illustrates one use of the present invention to facilitate media delivery as well as environmental monitoring, sensing, lighting, etc. where the media devices 12 are included on a plurality of light poles 32, 34, 36 illuminate a thoroughfare and/or output media thereto, such as through playback of audio, lighting, video and the like. A pole mounted digital banner 38 may be included as part of one of the media devices 12 to facilitate communicating video related media. A camera 40 may be included as part of one of the media devices 12 to facilitate synchronizing video or other image-based monitoring. A digital sign 42 or display smaller than the digital banner 32 may be included as part of one of the media devices 12 to indicate a street name or other information. A gateway 44 may be included to facilitate wireless communication with the other media devices 12, optionally as a function of information and other data received through a wired connection. The following media devices 12 also shown for exemplary purposes: a controllable facade light 46; a building mounted digital board 48; a water control 50 operable to facilitate controlling a water fountain; a bus stop digital banner 52; an interior light controller 54 and a building mounted lighting fixture 56. An environmental sensor 58 and an air quality detector 60 may be included to detect triggering events for the media devices 12, such as by collecting data and using the synchronization from the input to synchronize an action.

Figure 4:
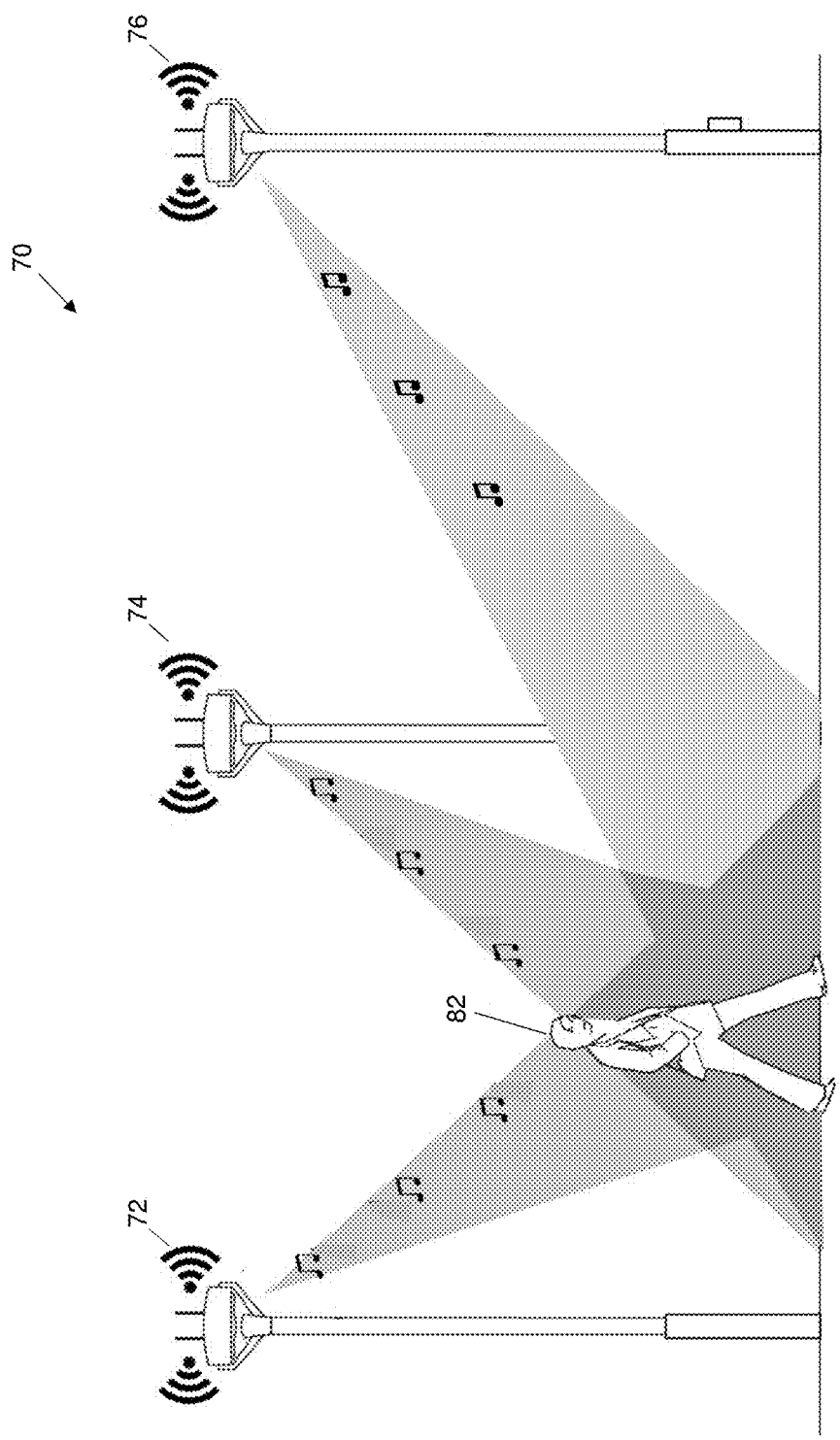
FIG. 4 illustrates audio from multiple media devices may be intelligently synchronized in accordance with one non-limiting aspect of the present invention.

One non-limiting aspect of the present invention contemplates harmonizing, coordinating, orchestrating or otherwise synchronizing operation of the media devices 12 in an intelligent manner, such as to enable human-perceptible media from multiple output devices to be received at a particular location in concert. One non-limiting aspect of the present invention contemplates coordinating asynchronous or sequential actions, as in strobes or other sensory messaging, where it may be desirable for the media output devices to generate sensory messages asynchronously or offset in time to neighboring media output devices, e.g., output the same strobe but at a slightly different point in time, with the contemplated synchronization being utilized to maintain the offset or asynchronous action. The present invention contemplates intelligently synchronizing virtually any type of media and is predominately described with respect to synchronizing audio for exemplary purposes as the corresponding operations and processes may be similarly used in facilitating synchronization of other media. FIG. 4 illustrates an exemplary audio schematic 70 where audio from multiple media devices 72, 74, 76 may be intelligently synchronized in accordance with one non-limiting aspect of the present invention. The illustrated media devices 72, 74, 76 may include a luminaire for illuminating an ambient environment associated therewith, optionally according to schedule or controllable methodology, and an audio player, decoder or other device operable to interface sound waves with the environment. The audio is shown as a plurality of audio frames (shown as musical symbols) being played from multiple media devices 72, 74, 76 to a person within an auditory range thereof. The audio frames may be stored on the media devices 72, 74, 76 within a file and/or a playlist, e.g., a song or warning message may be included in a single file and multiple files may be arranged for playback according to a playlist.

The audio frames and/or audio players may be formatted or operable to process Moving Pictures Expert Group (MPEG) frames, such as those compliant with International Organization for Standardization (ISO) standard ISO/IEC 11172-3 (MPEG-1 Audio), which defines three formats: the MPEG-1 Audio Layer I, Layer II and Layer III; and the ISO standard ISO/IEC 13818-3 (MPEG-2 Audio), which defines extended version of the MPEG-1 Audio: MPEG-2 Audio Layer I, Layer II and Layer III (MP3), the disclosures of which are hereby incorporated by reference in their entireties herein. Whether defined according to one of the MPEG standards or other standards, the audio frames may each include a header (not shown) and a payload (not shown) with the header including identifying information and other data associated with organizing, communicating or otherwise facilitating use of the audio frames and the payloads may include the audio samples to be played, i.e., the music, sounds, warnings or other perceptible auditory components. The audio frames are predominately described as one type of media have individually definable and identifiable segments requiring sequential or chronological playback in order to create a desired sound(s) (or a lighting event for path of egress) and is presented for exemplary non-limiting purposes as other audio formats besides frames may be similarly used without deviating from the scope and contemplation of the present invention.

The audio frames may be arranged in a chronological order whereby the audio frames are played in a particular, numbered sequence to deliver the desired sounds or series of sounds, such as by playing frame N followed by frame N+1, then frame N+2 . . . frame N+n where n is the ending frame of the song, message, sound, etc. One non-limiting aspect of the present invention contemplates utilizing the frame ordering to facilitate intelligently synchronizing audio for multiple media output devices 72, 74, 76 so as to prevent echoes and other undesirable temporal variations. The contemplated synchronization may include selecting one of the media devices, such as the first media device 72, to act as a conductor for the remaining media devices 74, 76, which may be referred to as non-conductors (any number of conductors and non-conductors may be employed). The conductor 72 may be configured to transmit sync messages to the non-conductors 74, 76 identifying when it has or will play a particular one of the audio frames. The conductor 72 may identify epochs or other temporal references sufficient to associate one or more of the audio frames with a determinable period in time. The non-conductors 74, 76 may compare their playback variables, such as speed, location, encoding, bit rate, etc., to the conductor epochs and/or other information included in the sync messages in order to individually time playback thereto.

Figure 5:
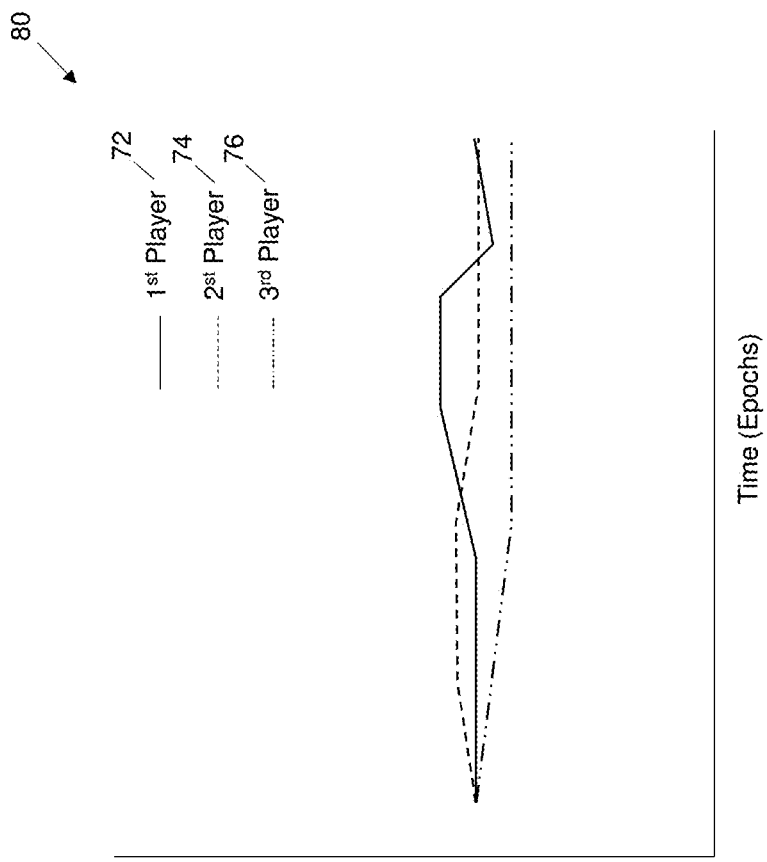
FIG. 5 illustrates a chart of temporal playback variations associated with multiple media players processing media frames in a non-linear manner.

The sync messages may each associate an epoch with a frame identifier and/or other playback related parameters that the non-conductors 74, 76 can then use to adjust their operation to be in concert with the conductor 72. The sync messages may be particularly beneficial in allowing the non-conductors 74, 76 to individual adjust for playback variations of the media players, such by pausing, skipping, fast forwarding or implementing other trick modes sufficient to time playback relative to the conductor. FIG. 5 illustrates a chart 80 of temporal playback variations associated with multiple media players 72, 74, 76 processing media frames (e.g., audio, video or other content frames) in a non-linear manner. The chart 80 graphs a speed or playback rate of the media players/media devices 72, 74, 76 varying slightly over time from a beginning frame (left-hand side) to an ending frame (right-hand side). The playback rates may be considered as non-linear due to the media players 72, 74, 76 individually processing the media frames for output at different rates as a result slight variations in the attendant decoding and/or output related operations. The media players 72, 74, 76 may experience temporal variations in an unpredictable or non-linear manner each time media is played such that the curve or graph of each media player 72, 74, 76 may vary over time and/or vary as a function of the media being played, i.e., less complex sounds may have one curve and more complex sounds may have a different curve.

The variable playback rates can influence the sensory perception of a 82 person within the corresponding auditory range (shaded area of two or more media devices 72, 74, 76) should the resulting variations cause the related signaling to arrive at perceptibly different intervals. The temporal range or offset sufficient to induce perceptible variations may vary depending on the complexity of the sound and other signaling parameters (e.g., reflection, propagation, attenuation, etc.). The controller 28 of each media device 72, 74, 76 may include an application capable of processing the information included in the sync messages to facilitate adjusting the playback rate (e.g., shape of the corresponding curve) of the corresponding media player 72, 74, 76 by slowing or increasing processing rates to at least approximate the playback rate of the conductor 72 in a manner sufficient to prevent echoes or other undesirable temporal variations. Given the unknown or non-linear performance of each media player 72, 74, 76, it may be difficult to adjust the playback rates or processing speeds of the media players to coincide with the conductor 72 such that other measures may be required to properly time playback of the audio frames.

One non-limiting aspect of the present invention contemplates the conductor 72 transmitting a plurality of sync messages, optionally on an intermittent or periodic basis, to enable the non-conductors 74, 76 to continuously adjust their playback position to coincide with the conductor 72. The playback positioning adjustments may correspond with the corresponding controller 28 identifying whether the corresponding media player 74, 76 is in sync or ahead/behind the conductor 72 i.e., whether the media device 74, 76 is playing or has played a particular frame at the same time that the conducted 72 has played or is playing the corresponding frame or whether the media device 74, 76 is playing or has played a particular frame before/after the conductor 72 has played or is playing the corresponding frame. The corresponding playback adjustments may include but are not limited to pausing playback in the event the media device 74, 76 is ahead of the conductor 72, skipping or forwarding playback in the event the media device 74, 76 is behind the conductor 72 or maintaining current operation in the event the media device 74, 76 is in sync with the conductor 72.

The sync messages may be associated with the conductor 72 playing or otherwise processing one of the audio frames for output, i.e., upon beginning to process the audio frame to determine the corresponding audio signaling and/or upon actually outputting the corresponding audio signal. The lag or delay associated with transmitting the sync messages may require the corresponding controllers 28 of the non-conductors 74, 76 to look backward for purposes of comparing their play history to the conductor 72 and thereafter adjust future playback accordingly. FIG. 6 illustrates a timing log 86 useful as one contemplated tool to facilitate keeping historical playback records in accordance with one non-limiting aspect of the present invention. The timing log 86 may be kept by each of the controllers 28 to identify when one or more of the audio frames associated with the audio file, playlist or sequence was played at the corresponding media player 22. While the controllers 28 may log each audio frame associated with the file or multiple files, FIG. 6 illustrates an exemplary scenario where the timing log 86 keeps a record of when the audio frames associated with the sync messages were output (referred to as sync frames). The sync frames may be determined as a function of information included in the corresponding frame header and/or based on positioning from a first frame in the chronological order, e.g., every x-number of frames from the beginning frame may be considered as a sync frame for tracking purposes.

The timing log 86 may include a first column 88 associated with identifying the sync frames, a second column 90 associated with identifying when the media player 22 of the corresponding non-conductor 74 output the matching sync frame, a third column 92 associated with when the media player 22 of the conductor 72 output the same sync frame and a fourth column 94 indicating a playback adjustment, if any, needed to re-adjust playback positioning of the corresponding non-conductor 74. The non-conductor and conductor timing may be set relative to epochs or other independent temporal references, which may optionally be set to the clock of the associated media device 72, 74, 76. The media devices 72, 74, 76 or the controller 28 associated therewith may include capabilities sufficient to execute network time protocol (NTP), such as through communications within the mesh network 16 and/or the source 14, or other timing operations sufficient to coordinate the clock 26 of each media device 72, 74, 76 to a common reference within an acceptable range of tolerance. One non-limiting aspect of the present invention contemplates assuming the clocks 26 of each media device 72, 74, 76 are sufficiently aligned such that the epochs indicated in the timing log 86 are a sufficient approximation of when each media player 22 output or processed the corresponding media frame for output.

The media device controllers 28 may keep track of the epochs listed in the second column 90 and then compare those epochs to the conductor epochs provided in the sync messages as shown in the third column 92. Corrective action may be implemented thereafter to facilitate controlling the frame positioning of the corresponding media player 22 to match playback of future frames to the conductor 72. FIG. 6 illustrates an exemplary scenario where the non-conductor 74 steps off or begins playing a first sync frame (S) in concert with the conductor 72, such as in response to a step-off message from the conductor 72 indicating when each non-conductor 74 is to begin. The log 86 indicates the non-conductor 74 thereafter beginning to slow until a sufficient offset occurs at a fifth sync frame (S4) whereupon an adjustment is made to forward the media player 22. The forwarding may include skipping one or more of the intervening frames between successive sync messages (a number of frames, referred to as non-sync frames, may be defined and specified in the chronological order or playlist between two sync frames) and/or the sync frames themselves may be skipped such that the media player 22 outputs a sixth sync frame (S5) and/or frames preceding the sixth sync frame (S5) at the same time as the conductor 72.

As shown, the non-conductor 74 slowly falls out of sync with the conductor 72 by a third sync frame (S3) with corrective action occurring later once the offset exceeds an acceptable threshold. The acceptable threshold may be set for each media device 72, 74, 76 according to instructions from the conductor 72 and/or the source 14 and may optionally be varied depending on the audio file or content type and/or signaling transmission characteristics (reflection, attenuation, etc.). The amount of forwarding may correspond with the acceptable threshold or an actual amount by which the non-conductor 74 is behind the conductor, e.g., a preset number of frames may be skipped equaling the threshold and/or an elapse time between corresponding conductor and non-conductor epochs may be used to approximate a duration of the forwarding. The time or other marker of duration may be related to fame identifiers associated with each audio frame header so as time playback of the next or subsequent frames to be in concert with the conductor 72. The non-conductor 74 is shown to keep pace with the conductor 72 after the pausing for a period of time corresponding with a seventh and eighth sync frame (S6, S7) before moving ahead of the conductor by an amount exceeding the acceptable threshold at an eleventh sync frame (S10) whereafter corrective action is taken to pause the media player 22.

The pausing may include preventing the media player 22 from playing one or more of the audio frames until playback of the audio frames occurring after the eleventh sync frame (S10) can play in concert with the conductor 72. A duration of the pausing may be determined similarly to the forwarding insofar as being set to a preset number of frames or length of time corresponding with the acceptable threshold and/or an actual elapse or difference between the non-conductor and conductor epochs. As operation of the non-conductor 74 may be non-linear, the pausing, forwarding or other corrective action based on actual elapse time differences between conductor and non-conductor epochs may be preferred over preset or fixed adjustments, particularly when compensating for rapid or extreme variations as use of preset adjustments may not be sufficient to align the non-conductor 74 with the conductor 72. The use of pausing and/or forwarding as corrective actions are described merely as exemplary processes for intelligently synchronizing the non-conductors 74, 76 to the conductor 72 as the present invention fully contemplates other manipulations, such as playing the audio files at a faster/slower rate, e.g., seeking or playing the audio frames at 1.5×, 2× or other rate values faster/slower than the conductor in proportion to the corresponding timing differences.

The timing log 86 is also presented for exemplary purposes to demonstrate certain values and information kept at the media devices 72, 74, 76 to facilitate the intelligent synchronization contemplated by the present invention. The controllers 28 may include algorithms or other mechanisms for tracking playback and facilitating alignment without necessary logging the sync and non-sync frames. The timing log 86 is illustrated as tracking only the sync frames for exemplary purposes as the non-sync frames between the sync frames may be similarly tracked for comparison purposes, such as to enable the controller 28 to compare or estimate when the conductor 72 has or will output the non-sync frames, i.e., timing of the conductor 72 for non-sync frames or frames for which sync messages were not transferred may be interpolated from the sync frame data. The lag or delay associated with receipt and processing of the sync messages, including relating the sync messages to information tabulated in the timing log 86, may result in the corresponding controllers 28 looking backward, i.e., back in time to assess playback of frames occurring before receipt of sync message, in order to assess temporal difference relative to the conductor 72 for purposes of using those differences to adjust future playback in the contemplated manner.

Figure 7:
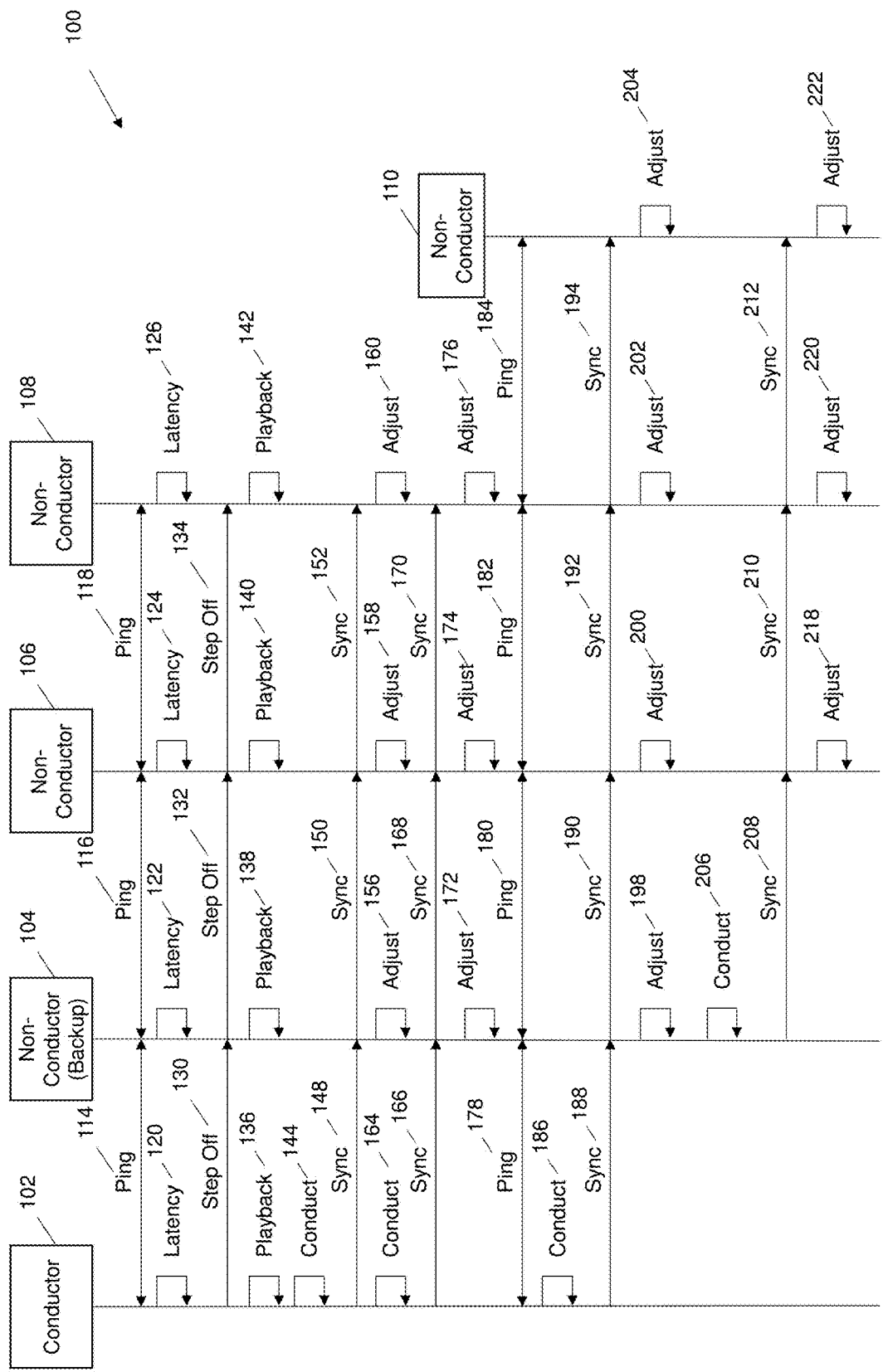
FIG. 7 illustrates a messaging diagram for a method of intelligently synchronizing media in accordance with one non-limiting aspect of the present invention.

FIG. 7 illustrates a messaging diagram 100 for a method of intelligently synchronizing media in accordance with one non-limiting aspect of the present invention. The method may be embodied in a computer-readable medium having a plurality of non-transitory instructions operable with a processor associated with one of the above-described media devices 12, source 14 or other entity having capabilities sufficient to facilitate operations contemplated herein. The above description predominately described operation of the present invention with respect to facilitating synchronization of an audio file transmitted as a plurality of audio frames from a plurality of media devices 12 within an auditory range of each other for exemplary non-limiting purposes. The method is predominately described with respect to facilitating intelligent synchronization for a media file or multiple immediate files, such as those specified within a playlist, schedule or other schema. The media file may be divided into a plurality of media frames and be synchronized similarly to the audio file and frames described above and is referenced to further highlight the capability of the present invention to facilitate synchronizing virtually any type of content, such as but not necessary limited to video, lighting, audio and other sensory-based or perceptible messaging, signaling or material (e.g., water of a water fountain). The contemplated synchronization is predominately described with respect to coordinating the media devices to output the same message at approximately the same time for exemplary purposes as the contemplated synchronization may similarly coordinate multiple media output devices to output the same or different media messages (or media files) in an asynchronous/sequential manner.

The use of frames to designate segments or divisions of a larger file useful in facilitating the contemplated intelligent synchronization is also presented for exemplary non-limiting purposes as other demarcations or suitable points within the media file may be similar employed without deviating from the scope and contemplation of the present invention. The present invention may be particularly beneficial in facility multi-source synchronization of streamed media or other forms of media distributed using markers other than frames to facilitate arranging the related data for playback, e.g., the envisioned synchronization may be similarly achieved through packet-based demarcations, timing references, etc. One non-limiting aspect the present invention presumes the media file or media frames being pre-loaded or otherwise stored at the media devices 12 prior to beginning playback, thereby eliminating the need for the synchronization processes to compensate for media delivery inconsistencies during playback. This is done merely to facilitate describing the fundamentals of the present invention as media transmission delays may be considered in adjusting operation of non-conductors without deviating from the scope and contemplation of the present invention, such by adjusting the length of the pausing/forward according to corresponding transmission influences.

FIG. 7 illustrates an exemplary environment where five media devices 102, 104, 106, 108, 110 are positioned on movable or immovable objects within a geographical area resulting in each of the media devices 102, 104, 106, 108, 110 being within an auditory/acoustical and/or visual range of least one of the other media devices 102, 104, 106, 108, 110. The geographical area may include one or more subjected regions or zones reachable with signaling from two or more of the media devices 102, 104, 106, 108, 110, which may be referred to as acoustical areas when reachable with audio signals and a visual area when reachable with visual signals. One non-limiting aspect of the present invention contemplates determining the subjected areas and other information associated with controlling sensory message (media) synchronization from non-sensory messages exchanged between the media devices 102, 104, 106, 108, 110. The influenced areas may be determined as a function of information, capabilities, data, etc. gleaned from a first plurality of ping messages 114, 116, 118 exchanged between the media devices 102, 104, 106, 108 according to communication capabilities of a corresponding mesh network or other network configuration associated therewith.

The first plurality of ping messages 114, 116, 118 may be utilized to glean location, capabilities, signaling, media and other information for the media devices 102, 104, 106, 108 associated therewith. A conductor process (not shown) may be implemented as a function of one or more the first plurality of ping messages 114, 116, 118 whereupon one of the media devices 102 may be determined to a conductor and the remaining media devices 104, 106, 108 determined to be non-conductors. Optionally, the conductor process may be similar to a coordinator process described in IEEE 802.15.4 for identifying a coordinator and/or may include determining one of the non-conductors 104 to be a backup conductor in the event conductor fails or is unable to broadcast sync message for a predetermined period of time (e.g., 30 ms or other interval associated with media playback rates). One of the media devices 110, which may be subsequently included as described below, may be initially being excluded from the first plurality of ping messages 114, 116, 118 due to being unavailable or unassociated with the networking of the other media devices 102, 104, 106, 108 when the first plurality of ping messages 114, 116, 118 were exchanged.

A latency process 120, 122, 124, 126 may occur at the conductor 102 and/or the non-conductors 104, 106, 108 to determine an amount of latency associated with signaling traveling therebetween. The latency processes 120, 122, 124, 126 may include determining travel time individually for messaging between the conductor 102 and each non-conductor 104, 106, 108 and/or between each of the non-conductors 104, 106, 108. The conductor 102 may thereafter transmit a step-off message 130 or multiple step-off messages 132, 134 to schedule each of the non-conductors 104, 106, 108 to begin playing the media file at an epoch or other discernable interval, such as in response to one or more of the media devices 104, 106, 108 individually sensing an environmental condition or a localized event unknown to the conductor 102. Assuming use of a step-off epoch, the timing may be selected as a function of the latency processing to schedule playback at a point in time sufficient for the step-off messages 130, 132, 134 to reach each media device 104, 106, 108 before playback is planned to commence. The step-off messages 130, 132, 134 may be communicated directly from the conductor 102 to the non-conductors 104, 106, 108 and/or relayed from one non-conductor 104, 106, 108 to one non-conductor 104, 106, 108 as with the ping messages 114, 116, 118. The step-off messages 130, 132, 134, in addition to identifying the step-off time, may identify the media file and/or multiple media files to be played thereafter. One non-limiting aspect of the present invention contemplates transmitting additional step-off messages (not shown), optionally at different times, so as to provide a think ahead process for preparing the media devices 102, 104, 106, 108 to output subsequent media files before the currently playing media file ceases.

A playback process 136, 138, 140, 142 may occur at each of the media devices 102, 104, 106, 108 upon detecting occurrence of a triggering event associated with the step-off messages 130, 132, 134, i.e., upon the corresponding clock determining occurrence of the step-off time. The playback processes 136, 138, 140, 142 may include each media device 102, 104, 106, 108 autonomously beginning and continuing to play the media file without adjustment until receiving a sync message or other instructions from the conductor 102. The playback processes 136, 138, 140, 142 may include the media devices 102, 104, 106, 108 performing operations associated with communicating the media frames or other segments of the media file to an ambient environment associated therewith, which may include the media devices 102, 104, 106, 108 generating acoustical and/or visual signaling for acoustical and/or visual components included within the media payload or otherwise providing sensory or perceptible messages, content, material, etc. to the surrounding area. The playback processes 136, 138, 140, 142 may also include the media devices 102, 104, 106, 108 generating a timing log or otherwise keeping track of the media frames during playback so as to facilitate the calculations associated with implementing adjustments necessary to keep synchronized with the conductor 102, optionally to facilitate the pausing and forwarding operations described above.

A conductor process 144 may correspond with the conductor 102 transmitting one or more sync messages 148, 150, 152 associated with the conductor 102 playing one or more of the media frames. The sync messages 148, 150, 152 may be transmitted from the conductor 102 to each of the non-conductors 104, 106, 108 individually and/or relayed from one non-conductor 104, 106, 108 to another non-conductor 104, 106, 108. The non-conductors 104, 106, 108 may execute a plurality of adjustments 156, 158, 160 or other operations as a function of information included within the sync messages 148, 150, 152 to facilitate coordinating message output in concert with the conductor 102. The conductor 102 may thereafter continue conducting 164 and transmitting additional sync message 166, 168, 170 and the non-conductors 104, 106, 108 may continue to make any necessary adjustments 172, 174, 176 as a function thereof. The sync messages 166, 168, 170 may optionally be tailored to the area(s) reachable with at least two of the media devices 104, 106, 108 such that different sync messages 166, 168, 170 may be transmitted to different media devices 104, 106, 108 depending on the required coordination. This may include the conductor 102 conducting groups of two or more non-conductors 104, 106, 108 differently and/or other instructing the grouping to make adjustments differently depending on information included the sync messages 166, 168, 170, which may be beneficial in adjusting media output as a person or object moves between the media devices 104, 106, 108.

Assuming each of the non-conductors 104, 106, 108 are intended to synchronize media output to the same area, each non-conductor 104, 106, 108 may be configured to facilitate adjusting 156, 158, 160 its operation to match the conductor 102. This may include, for example, a first non-conductor 104 continuing its current playback rate, a second non-conductor 106 pausing playback and/or a third non-conductor 108 forwarding playback. Advantageously, the intelligent synchronization may occur without the conductor 102 having to sample the media files when output, such as to avoid the need for generating and storing recording of audio or video sampling in order to facilitate synchronizing the non-conductors 104, 106, 108. A second plurality of ping messages 178, 180, 182, 184 may be exchanged between the conductor 102 non-conductors 104, 106, 108, 110 in the event a new media device 110 becomes available or otherwise attempts to act in concert with the currently active media devices 102, 104, 106, 108. The second plurality of ping messages 178, 180, 182, 184 may be similar to the first plurality of ping messages 114, 116, 118 and sufficient to facilitate determining whether the conductor 102 is to remain as a conductor and/or whether the new media device 110 should become the conductor and/or to facilitate identifying capabilities and other information for the new media device 110.

The conductor may continue conducting 186 and thereafter transmit subsequent sync messages 188, 190, 192, 194 to the previous non-conductors 104, 106, 108 as well as the new non-conductor 110. The non-conductors 104, 106, 108, 110 may thereafter facilitate adjusting operation 198, 200, 202, 204, if necessary, of the corresponding media players to match the conductor 102. The new non-conductor 110 may consider the corresponding sync message 194 as a step-off message or to otherwise instigate playback to coincide with a suitable video frame of the conductor 102. A backup conductor process 206 is shown to occur upon the conductor 102 failing to continue transmitting sync messages or upon a need for the conductor 102 to transmit the media expiring, e.g., the conductor 102 may be selected for a brief period of time while a user is within the vicinity and thereafter become unnecessary once the user moves and/or the conductor 102 may be selected to conduct while sensing or otherwise determining the triggering event and thereafter cease conducting when the triggering event ends. The previously determined backup conductor 104 may then instigate a conductor process 206 similar to the above-described conductor process whereupon sync messages 208, 210, 212 may be communicated to the other or remaining non-conductors 106, 108, 110 to facilitate syncing intelligently syncing 218, 220, 222 the operation thereof to the backup conductor.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for intelligently synchronizing playback of a media file from a plurality of media players to compensate for playback variations associated with the plurality of media players attempting to provide in concert playback of a plurality of media frames included in the media file, the method comprising:
designating one of the plurality of media players to be a conductor and the remaining one or more of the plurality media players to be non-conductors;
intermittently broadcasting a plurality of sync messages from the conductor to the non-conductors as the conductor plays the media file, each of the plurality of sync messages identifying a conductor epoch associated with the conductor playing a corresponding one of the plurality of media frames; and
synchronizing playback of the non-conductors to compensate for non-linear playback variations associated with the plurality of media players processing the plurality of media frames for output at different playback rates, the synchronizing using the plurality of sync messages to facilitate individually adjusting the playback rates of each non-conductor to be within a temporal offset relative to the conductor epochs.

2. The method of claim 1 further comprising:
generating individual timing logs for each of the non-conductors, the timing logs identifying non-conductor epochs associated with the corresponding non-conductor playing a corresponding one of the plurality of media frames;
synchronizing playback of a first non-conductor of the non-conductors by pausing play of the media file for a first period of time approximately equal to time elapsing between one of the non-conductor epochs of the first non-conductor and a corresponding one of the conductor epochs;
synchronizing playback of a second non-conductor of the non-conductors by forwarding play of the media file for a second period of time approximately equal to time elapsing between one of the non-conductor epochs of the second non-conductor and a corresponding one of the conductor epochs; and
pausing play of the first non-conductor while at a same time forwarding play of the second non-conductor.

3. The method of claim 1 further comprising:
designating one of the non-conductors to be a backup conductor; and
upon failure of the conductor to continue broadcasting one or more of the plurality of sync messages:
i) intermittently broadcasting a plurality of backup sync messages from the backup conductor, each of the plurality of backup sync messages identifying a backup epoch associated with the backup conductor playing a corresponding one of the plurality of media frames; and
ii) synchronizing playback of the non-conductors to compensate for playback variations using the plurality of backup sync messages to facilitate determining temporal differences between when the backup conductor and the non-conductors play the media frames associated with the backup conductor epochs.

4. The method of claim 1 further comprising synchronizing playback by adjusting the playback rates of the non-conductors such that the temporal offset between each non-conductor and the conductor is less than a threshold associated with a human perceiving differences in playback of the plurality of media frames.

5. The method of claim 4 further comprising adjusting the playback rate of each non-conductor to approximate a timing difference between when the non-conductors and the conductor respectively played the plurality of media frames.

6. The method of claim 1 further comprising:
determining a location within an auditory range and/or a visual range of each of the plurality of media players; and
adjusting the playback rates of the non-conductors such that the temporal offsets associated therewith are insufficient to produce human-perceptible variations in playback of the plurality media frames at the location.

7. A system for intelligently synchronizing sensory messages of the type having an auditory component and/or a visual component, the system comprising:
a first device positioned at a first location having:
i) a first player configured to playback a plurality of sensory messages to a first ambient environment according to an order specified in a playlist;
ii) a first controller configured to periodically broadcast non-sensory sync messages during playback of the playlist, each sync message specifying an epoch associated with when the first player played a corresponding one of the plurality of sensory messages;

a second device positioned at a second location sufficiently close to the first location to be within an auditory range and/or a visual range of the first device, the second device having:
i) a second player configured to playback the plurality of sensory messages to a second ambient environment according to the order specified in the playlist; and
ii) a second controller configured to adjust for temporal variations while the second player plays the playlist as a function of the epochs specified in the sync messages so as to intelligently synchronize the second player to the first player.

8. The system of claim 7 wherein the second controller is configured to:
pause the second player when one or more of the epochs indicate the second player to be ahead of the first player;
forward the second player when one or more of the epochs indicate the second player to be behind of the first player;
generate a timing log identifying a time when the secondary player plays one or more of the sensory messages; and
determine a length of the pause to approximately equal an amount of time elapsing between at least one of the times and the epoch identified in the sync message for the corresponding one of the sensory messages.

9. The system of claim 7 further comprising a third device positioned at a third location sufficiently close to at least one of the first location and the second location to be within an auditory range and/or a visual range of at least one of the first device and the second device, the third device having:
a third player configured to playback the plurality of sensory messages to a third ambient environment according to the order specified in the playlist; and
a third controller configured to:
i) adjust for temporal variations while the third player plays the playlist as a function of the epochs specified in the sync messages so as to intelligently synchronize the third player to the first player while the first controller is broadcasting the plurality of sync messages; and
ii) periodically broadcast non-sensory, backup sync messages during playback of the playlist when the first controller fails to broadcast the plurality of sync messages, each backup sync message specifying a backup epoch associated with when the third player plays a corresponding one of the plurality of sensory messages.

10. The system of claim 9 wherein:
the first controller is configured to broadcast a non-sensory, step-off message to the second and third controllers sufficient to facilitate starting playback of the playlist at the second and third player in concert with playback of the playlist at the first player; and
the second controller is configured to adjust for temporal variations while the second player plays the playlist as a function of the backup epochs specified in the backup sync messages so as to intelligently synchronize the second player to the third player when the first controller fails to broadcast the plurality of sync messages.

11. The system of claim 10 further comprising a source configured to wireless transmit the plurality of sensory messages to the first, second and third devices for playback prior to the first, second and third players starting playback of the playlist.

12. The system of claim 7 wherein the second controller adjust for temporal variations by adjusting a playback rate of the second player relative to the epochs specified in the sync messages such that the first and second players subsequently playback the plurality of sensory messages in concert to avoid human-perceptible playback variations at the first device.

13. The system of claim 7 wherein:
the first controller is configured to:
i) transmit a non-sensory, step-off message to the second controller sufficient to facilitate starting playback of the playlist at the second player in concert with playback of the playlist at the first player;
ii) calculate a travel time for the step-off message to reach the second controller; and
iii) control the first player to delay starting playback of the playlist following transmission of the step-off message for a period approximating the travel time; and
the second controller is configured control the second player to begin playback of the playlist upon receipt of the step-off message.

14. A method for intelligently synchronizing playback of a media file having a plurality of media frames arranged in a chronological order, the method comprising:
determining a plurality of media players forming an acoustical area characterized by each of the plurality of media players being within an auditory range of at least another one of the plurality of media players;
determining a first epoch associated with the plurality of media players beginning concerted playback of the media file starting with a first media frame of the plurality of media frames;
determining a second epoch associated with a first media player of the plurality of players playing a second media frame of the plurality of media frames occurring in the chronological order after the first media frame; and
synchronizing at least a second media player and a third media player of the plurality of media players to playback a third media frame of the plurality of media frames occurring in the chronological order after the second media frame relative to the second epoch so as to intelligently synchronize at least the second and third media players relative to the first media player.

15. The method of claim 14 further comprising facilitating pausing playback of the media file at the second media player for a first length of time whereafter the second media player then begins playback of the media file with the third media frame playing at a third epoch, the third epoch coinciding with the first media player playing the third media frame.

16. The method of claim 15 further comprising pausing playback of the second media player during the first length at a fourth media frame of the plurality of media frames occurring immediately before the third media frame in the chronological order.

17. The method of claim 14 further comprising facilitating forwarding playback of the media file at the third media player for a second length of time whereafter the third media player then begins playback of the media file with the third media frame at a third epoch, the third epoch coinciding with the first media player playing the third media frame.

18. The method of claim 17 further comprising forwarding playback of the second media player during the second length such that at least a fifth media frame of the plurality of media frames occurring before the third media frame in the chronological order is skipped.

19. The method of claim 14 further comprising transmitting a frame sync message identifying the second epoch and the second media frame to facilitate synchronizing at least the second and third media players, the frame sync message being operable with synchronization controllers operating at the second and third media players to adjust playback of the media file therefrom.

20. The method of claim 14 further comprising transmitting an entirety of the media file to each of the plurality of media players in advance of the first epoch.

* * * * *